Oct. 8, 1957 ISAMU IKEUCHI 2,808,647
METAL SHEARS
Filed July 30, 1956 2 Sheets-Sheet 1
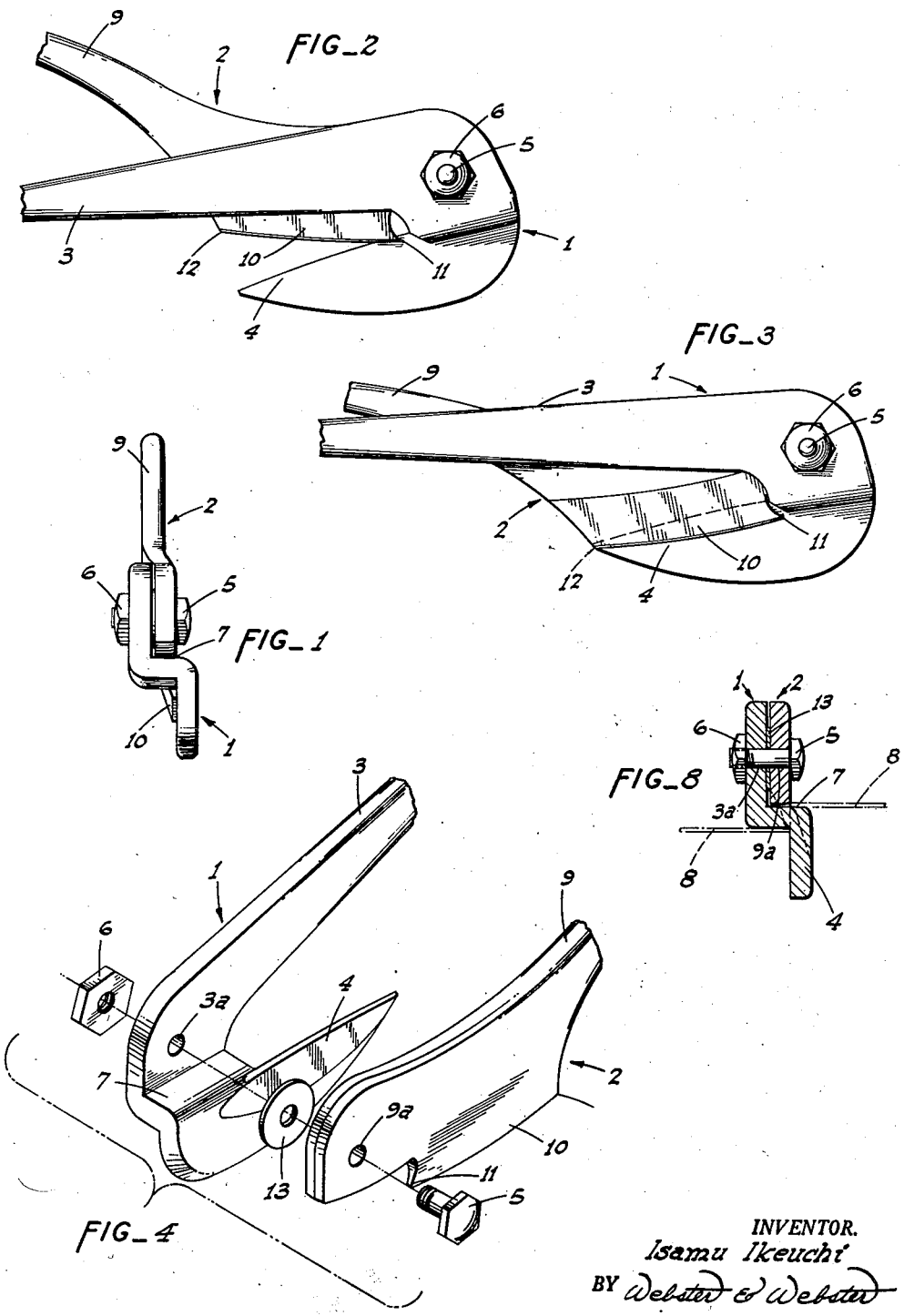
INVENTOR.
Isamu Ikeuchi
BY Webster & Webster
ATTORNEYS Oct. 8, 1957 ISAMU IKEUCHI 2,808,647
METAL SHEARS
Filed July 30, 1956 2 Sheets-Sheet 2
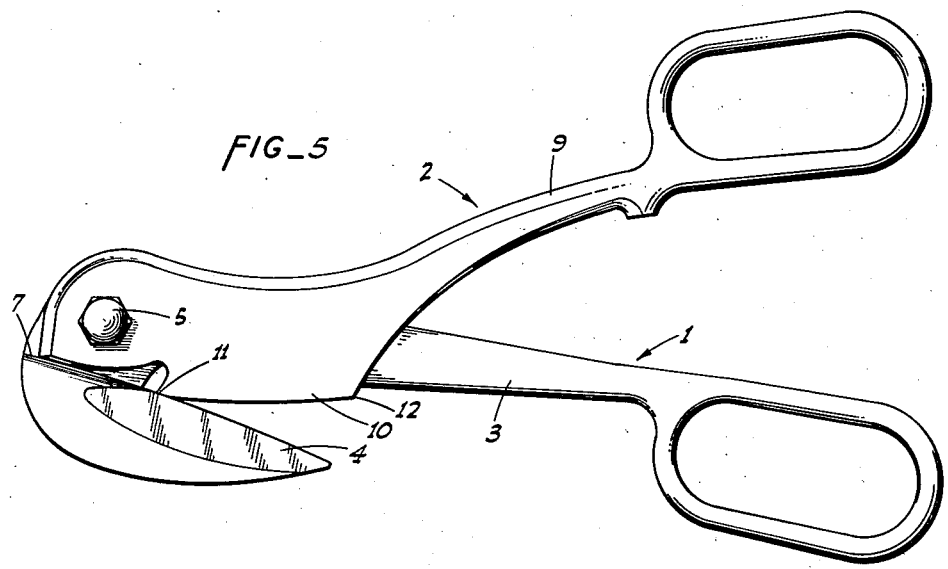
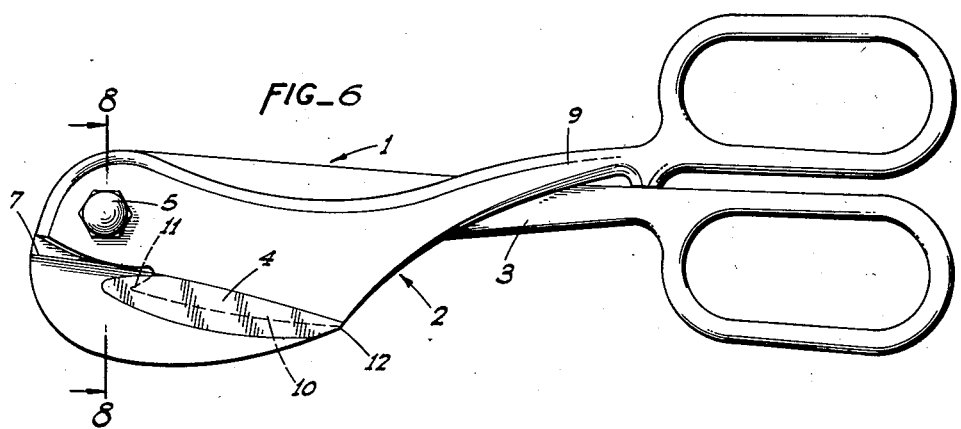
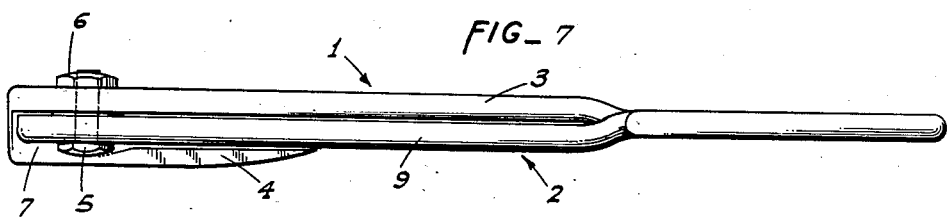
INVENTOR.
Isamu Ikeuchi
BY Webster & Webster
ATTORNEYS

United States Patent Office 2,808,647
Patented Oct. 8, 1957

2,808,647

METAL SHEARS

Isamu Ikeuchi, Walnut Grove, Calif.

Application July 30, 1956, Serial No. 601,006

3 Claims. (Cl. 30—253)

This invention pertains to improved hand shears, and more particularly to shears or snips adapted to cut sheet metal and the like.

Previously known shears which are adapted to cut sheet metal are usually of the push type, rather than the pull type; i. e., the blades and handles project in opposite directions from the pivot member.

The shears contemplated by this invention are of the pull type wherein the handles and blades project in substantially the same direction from the pivot member whereby—in operation—the shears may be pulled across a piece of metal so that the hands never come into contact with the sharp edges which have been cut.

Conventional shears which are utilized to cut metal have both blades substantially in line with their respective handles and when metal is cut by such shears, the action of the blades not only cuts the metal, but also tends to bend it.

The novel shears contemplated by this invention have the blade of one of the scissor members offset from the handle thereof in the direction of the axis of the pivot member so that the blade of the second scissor member—which is substantially coaligned with its handle—is positioned between the blade and handle of the first scissor member. The portion of the first scissor member which connects the blade and the handle forms a shoulder —as explained in the body of the specification—which supports the metal which is being cut, and restricts the bending action.

Most metal shears utilize blades which have a straight edge, while the device contemplated by this invention has at least one of the blades curved in order to improve the cutting action. The shown embodiment curves the blade which is in line with its handle, but does not curve the blade which is offset from its handle. Alternatively, both or either blade may be curved.

Previously known shears are pointed when they are closed, which makes them dangerous to carry. However, the shears contemplated by this invention have the blades disposed and contoured so that when said blades are closed the shears are not pointed and may be safely placed in a workman's pocket, or otherwise carried on his person.

It is therefore an object of this invention to provide novel hand shears for sheet metal or the like.

It is another object of the invention to provide novel shears which are adapted to be pulled when used.

It is still another object of this invention to provide novel shears, of the pull type, wherein one of the blades is offset from its handle and wherein the second blade cooperates with the offset blade and is between the offset blade and the handle thereof.

Further objects of this invention are to provide shears, which may be safely carried upon the person of a workman, which do not materially bend the metal which is being cut, and which are particularly adapted to cut flat or cylindrical stock.

It is also an object of this invention to provide practical, reliable, and durable metal shears which are exceedingly effective for the purpose for which they are designed.

These objects are accomplished by means of such structure and relative arrangement of parts as will fully appear by a perusal of the following specification and claims.

In the drawings:

Fig. 1 is a front end view of the shears.

Fig. 2 is a fragmentary side elevation or profile view of the shears, taken from the left in Fig. 1, in opened position.

Fig. 3 is a fragmentary side elevation or profile view of the shears, taken from the left in Fig. 1, in closed position.

Fig. 4 is an exploded view of the shears.

Fig. 5 is a side elevation or profile view of the shears, taken from the right in Fig. 1, shown in open position.

Fig. 6 is a side elevation or profile view of the shears taken from the right in Fig. 1, shown in closed position.

Fig. 7 is a top plan view of the shears.

Fig. 8 is a transverse section, taken on line 8—8 of Fig. 6.

Referring now more particularly to the drawings, and to the characters of reference marked thereon, scissor members 1 and 2 are secured together adjacent their forward ends to rotate through a limited angle about a pivot member; the handle 3 and blade 4 of the scissor member 1 projecting in substantially the same direction or rearwardly from the pivot member, the latter being indicated at 5.

In other words, both handle 3 and blade 4 project toward the hand of the operator. Blade 4 is offset in the direction of the axis of pivot member 5 from handle 3 of scissor member 1; the offset portion 7, shown clearly in Figs. 1, 4, and 8, forming a shoulder upon which the cut material or metal 8 rests. See Fig. 8.

A handle 9 and blade 10 form scissor members 2; the blade 10 being substantially co-linear with handle 9, and both extending rearward from the pivot member 5 in cooperating relation to the handle 3 and blade 4 of scissor member 1. The cutting edge of blade 10 is preferably curved to increase the cutting action of the shears.

The handle 3 is mounted on pivot member 5 by hole 3a, and handle 9 is mounted on pivot member 5 by hole 9a. Scissor members 1 and 2 are assemled with blade 10 positioned between blade 4 and handle 3 with blades 4 and 10 in cutting engagement; a spring bushing 13 being positioned upon pivot member 5 between handle 3 and handle 9 to maintain blade 10 in proper engagement with the blade 4. The pivot member 5 is shown as a bolt with nut 6 on the end thereof.

When scissor members 1 and 2 are in position with the blade closed, the outer end contour of the blades, designated at 12, is non-pointed so that the shears may be easily and safely carried in the pocket of a worker.

The inner end of the cutting edge of blade 10 has a notch 11 formed therein, and said blade 10 is positioned so that, when the shears are full open, notch 11 still engages blade 4. A wire can be inserted in the hole formed by notch 11, blade 4, and offset shoulder 7, and the wire readily cut when the shears are closed.

In use of the described shears, they are used with a scissors action but are pulled through the work rather than pushing as with conventional shears. By pulling the shears, a more forceful cutting action can be obtained, the cutting line is more visible to the user, and the hands are not exposed to the cut-metal edges. Further, with the offsetting of blade 4 by shoulder 7, so that said blade 4 cooperates with blade 10 on the side opposite handle 3, the work—as cut—rides in a substantially straight line path above and below said shoulder 7 so that bending or distortion does not occur.

There has thus been provided novel shears for cutting sheet metals, although obviously such shears can be extended to the cutting of any sheet-like material, such as paper, cardboard, and the like; the shears being useful not only with flat stock, but also that which is cylindrical, such as sheet metal pipe.

Although a particular embodiment of the device of this invention has been shown in the drawings and described in the above specification, it is not intended that the invention should be limited by the described embodiment, but only in accordance with the spirit and scope of the appended claims.

Having thus described the invention, the following is claimed as new and useful, and upon which Letters Patent are desired:

1. A pair of shears of the pull type comprising a pivot member; a first scissor member adapted to turn about said pivot member, having a blade and a handle projecting rearwardly from said pivot member, said blade being offset from said handle by a shoulder for engaging material which is to be cut, said offset being in the direction of the axis of said pivot member; a second scissor member adapted to turn about said pivot member, having another blade and handle substantially in co-alignment and projecting from said pivot member in substantially the same direction as the blade and handle of said first scissor member, said other blade being positioned between the blade and handle of said first scissor member to engage said blade for cooperating shearing action.

2. A pair of shears, of pull type, comprising a rearwardly extending blade having a shoulder projecting laterally from the forward portion of said blade, a handle extending rearwardly from the shoulder in laterally offset relation to said blade, another rearwardly extending blade cooperating with said first named blade and disposed between the latter and said handle, means transversely pivoting said other blade on the handle adjacent the forward ends thereof, and another handle extending rearwardly from said other blade.

3. A pair of shears, as in claim 2, in which the shoulder is provided with a longitudinal work-supporting face, said face being alined with the cutting edge of the first named blade; the edge of the first named blade which faces said cutting edge being spaced therefrom.

References Cited in the file of this patent

UNITED STATES PATENTS 838,298    Briggs _____ Dec. 11, 1906

FOREIGN PATENTS 11,779    Great Britain _____ of 1884